Patented Aug. 21, 1945

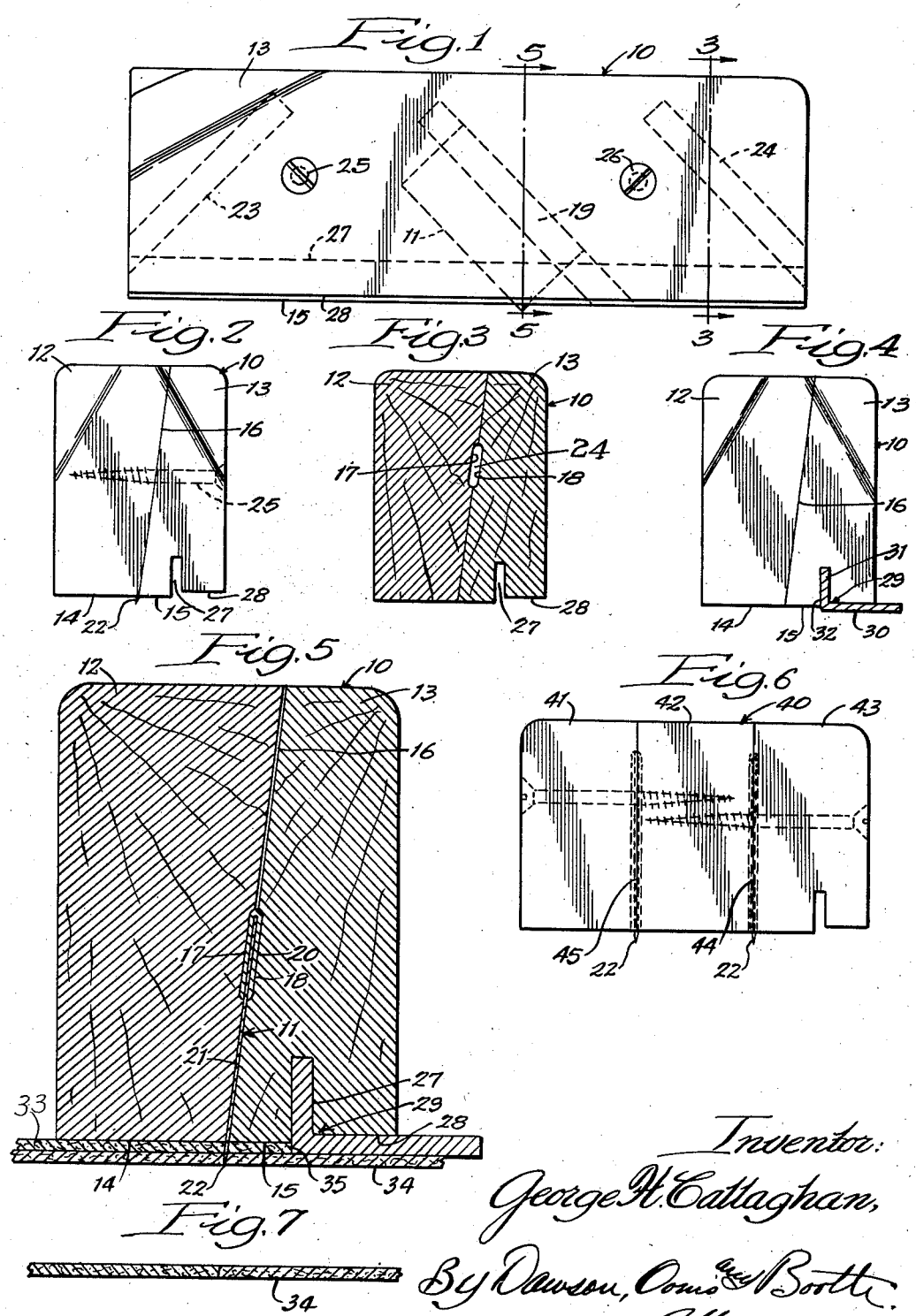

2,383,368

UNITED STATES PATENT OFFICE 2,383,368

DEVICE FOR CUTTING LINOLEUM AND THE LIKE

George H. Callaghan, Chicago, Ill., assignor, by direct and mesne assignments, to John H. Glover, Chicago, Ill.

Application December 26, 1942, Serial No. 470,173

5 Claims. (Cl. 30—293)

This invention relates to a device for cutting linoleum and the like, and more particularly to a device for cutting linoleum to form a matching joint between a pair of sheets or layers thereof.

An object of the invention is to provide a device which will cut a sheet of linoleum in such a manner as to form a beveled edge thereon. Another object is to provide beveled edges on a pair of sheets or layers of linoleum, with the edges registering with each other to form a matching joint. A further object is to provide a cutting blade carried in a base or handle member which is adjustable as to depth to regulate and control the depth of the cut which is made thereby. Yet another object is to provide a device in which the cutting blade is adjustable not only as to depth but also as to position within the carrying member and is readily releasable therefrom.

Another object of the invention is to provide a device including means for causing the cutting blade to move along a line which is disposed a predetermined distance from the edge of the sheet or layer of linoleum which is to be cut.

Other features and advantages will appear from the following specification and drawing, in which—

Fig. 1 is a side elevational view of the device; Fig. 2 is an end elevational view of the same device; Fig. 3 is a transverse sectional view taken along the line 3—3 of Fig. 1; Fig. 4 is an end elevational view of the device including a straight edge member for maintaining the cutting blade in proper position; Fig. 5 is an enlarged transverse sectional view taken along the line 5—5 of Fig. 1 showing the device in operation; Fig. 6 is an end elevational view of a modified form of the device; and Fig. 7 is a fragmentary sectional view of the joint formed in strips or sheets of linoleum by means of the use of the cutting device of the invention.

The invention contemplates a device by which a strip or sheet of linoleum may be cut along a straight line and is particularly suitable for cutting a pair of overlapping sheets or strips of linoleum to form a matching joint between the strips.

In the embodiment of the invention described herein, a carrying member or base 10, which may be made of wood or other suitable material, supports a cutting blade 11. The base 10 preferably includes a pair of separable sections 12 and 13, each of the sections having flat bottom portions 14 and 15 at the lower ends thereof. The sections 12 and 13 are so constructed as to be joined along a line 16 which is disposed at a small acute angle with respect to the normal to the flat bottom surfaces 14 and 15.

The sections 12 and 13 may be equipped with registering grooves 17 and 18, which together form the recess 19, as seen in Fig. 1. The recess 19 is angularly disposed within the base 10 and extends from the upper portion to the lower end thereof.

The cutting blade 11, as seen particularly in Fig. 5, may consist of a conventional razor blade having a thickened bead 20 at the upper portion thereof, a body portion 21, and a cutting edge 22. The bead 20 is received within the recess 19, and the engagement of the sections 12 and 13 with each other holds the blade 11 in position therebetween. The bead 20 may be moved longitudinally within the recess 19 to lower or raise the cutting edge 22 with respect to the bottom surfaces 14 and 15.

The base 10 is equipped with an additional pair of recesses 23 and 24 adjacent the opposite ends of the base. These recesses 23 and 24 may correspond exactly in construction to the recess 19. However, the recess 23 is preferably disposed at an angle opposed to that of the recess 19. The recesses 23 and 24 serve to provide additional positions in the base within which the blade 11 may be received. This is particularly desirable when the cutting edge of the blade is to be at either end of the base 10.

The sections 12 and 13 of the base 10 may be secured to each other by screws 25 and 26, or other suitable means. Preferably, the means for securing the sections to each other is such that they may be readily released for adjustment or removal of the blade 11.

At the lower portion of the base 10 is a longitudinal recess 27 which extends throughout the length of the base 10. The section in which the recess 27 is disposed is also cut off at the lower edge between the recess and the outer side of the section, as seen at 28, to provide a recess for receiving the base of a straight edge member. Preferably, the vertical distance between the surface 28 and the bottom surfaces 14 and 15 is approximately one-half of the thickness of the base of the straight edge member.

The straight edge member 29 is provided with a flat base portion 30 and with a vertical flange 31 extending upwardly therefrom. Preferably, the flange is disposed along one of the lateral edges of the base portion 30 to provide a conventional straight edge construction. In this instance, the edge 32 of the lower portion of the flange provides a straight flat edge for engagement with the edge of a sheet or layer of linoleum to which the cutting device is to be applied.

In operation, the device may be used to cut through a pair of overlapping sheets or strips 33 and 34 of linoleum or other similar material. In this event, the blade 11 is adjusted as to depth within the base 10 so that the portion of the blade projecting below the flat bottom surfaces 15 and 16 is of a depth substantially equal to the combined thickness of the two layers 33 and 34 of linoleum. The portion of the base 30 of the straight edge 29, which is not received in the recess at 28 and thus projects below the flat bottom surfaces 14 and 15, is of a thickness substantially equal to the thickness of the layer 33 of linoleum. The straight edge 32 is then brought into abutting engagement with the edge 35 of the linoleum strip.

Since the straight edge 29 is of a substantial length, preferably of the length of the cut to be made, the straight edge 32 abutting the edge 35 of the linoleum sheet 33 maintains the cutting blade 11 in alignment with respect to the edge of the linoleum sheet.

The straight edge 32 is placed in engagement with the edge 35 of the linoleum sheet 33. The base 10 is then placed in position, with the recess 27 receiving the flange 31 of the straight edge member. The base 10 is then moved longitudinally along the flange 31 of the straight edge member 29, and the cutting edge 22 of the blade 11 cuts the layers 33 and 34 of the linoleum, as seen in Fig. 5. The beveled cut edges formed by this action permit the linoleum sheets to be brought into engagement in a matching joint, as seen in Fig. 7. In this joint, the upper surface of one of the sheets slightly overlies the cut edge of the other sheet. Thus, even if the cut were not exact and accurate, the matching joint is still obtained.

In the modification of the invention shown in Fig. 6, the base 40 includes three sections 41, 42 and 43, and a pair of blades 44 and 45. In other respects, the construction corresponds essentially to that shown in Figs. 1 to 5 of the drawing and need not be described in detail herein.

With the modified form of the invention, it is possible to cut a strip of linoleum of a width equal to the distance between two blades. Preferably, in this construction, the blades are vertical and are disposed at an angle of 90° with respect to the lower surface of the base.

Although the invention has been described in connection with specific embodiments, it will be apparent that modifications and changes may be made without departing from the spirit and scope of the invention.

I claim:

1. A device for cutting linoleum and the like, comprising a base member having a flat portion at the lower end thereof, a cutting blade carried by said member and extending downwardly below said flat portion, said blade being disposed at an acute angle with respect to the normal to said flat portion and having a cutting edge at the lower end thereof, said member having a longitudinal recess therein laterally spaced from said blade, and a member received within said recess and extending downwardly therefrom below said flat portion for engaging the edge of a layer of material to be cut to guide the cutting edge of said blade along the material at a predetermined distance from the edge thereof.

2. A device for cutting linoleum and the like, comprising a base member having a flat portion at the lower end thereof, a cutting blade carried by said member and extending downwardly therefrom below said flat portion, said blade being disposed at a small acute angle with respect to the normal to said flat portion and having a cutting edge at the lower end thereof, said member being equipped with a longitudinal recess therein laterally spaced from said cutting blade, and a member having a flat base with a straight lateral edge and a vertical flange substantially parallel to said edge and extending upwardly from the base, said flange being longitudinally slidably received within said recess, said edge extending downwardly below said flat portion to engage the edge of a layer of material to be cut whereby the cutting edge of said blade is guided along the layer of material at a predetermined distance from the edge thereof.

3. A device for cutting linoleum and the like, comprising a handle member having a flat portion at the lower end thereof and containing two sections releasably secured together, the plane dividing said sections being at a small acute angle with respect to the normal to said flat portion, a cutting blade supported between said sections for vertical adjustment and extending downwardly therefrom below said flat portion, said blade being substantially in said plane and having a cutting edge at the lower end thereof, said member being equipped with a longitudinal recess therein and laterally spaced from said cutting blade, and a straight edge member having a flat base with a straight lateral edge and a vertical flange substantially parallel to said edge and extending upwardly from said base, said flange being longitudinally slidably received within said recess, said edge extending downwardly below said flat portion to engage the edge of a layer of material to be cut whereby said blade is guided along the layer of material at a predetermined distance from the edge thereof.

4. A device for cutting linoleum and the like, comprising a base member having a flat portion at the lower end thereof, a cutting blade carried by said member and extending downwardly therefrom below said flat portion, said blade being disposed at a small acute angle with respect to the normal to said flat portion and having a cutting edge at the lower end thereof, said member being equipped with a longitudinal recess therein laterally spaced from said cutting blade and adapted to slidably receive a guide member.

5. A device for cutting linoleum and the like, comprising a base member having a flat portion at the lower end thereof, a cutting blade carried by said member and extending downwardly below said flat portion, said blade being disposed at an acute angle with respect to the normal to said flat portion and having a cutting edge at the lower end thereof, and a guide member in engagement with said base member and extending downwardly therefrom below said flat portion for engaging the edge of a layer of material to be cut to guide the cutting edge of said blade along the material at a predetermined distance from the edge thereof, said blade extending downwardly from said blade portion a distance greater than that by which said guide member extends downwardly below said flat portion whereby the cutting blade is effective to cut material which is disposed below said guide member.

GEORGE H. CALLAGHAN.